United States Patent
Saeman

[11] 3,918,168
[45] Nov. 11, 1975

[54] METHOD FOR DRYING ADHERENT PARTICULATE MATTER SUCH AS A POLYVINYL CHLORIDE RESIN

[75] Inventor: Walter C. Saeman, Hamden, Conn.

[73] Assignee: Olin Corporation, New Haven, Conn.

[22] Filed: Oct. 4, 1974

[21] Appl. No.: 512,148

[52] U.S. Cl. .................. 34/11; 34/135; 34/136; 432/118
[51] Int. Cl.² .......................................... F26B 7/00
[58] Field of Search ........ 34/11, 135, 136; 432/110, 432/111, 118

[56] References Cited
UNITED STATES PATENTS

| | | |
|---|---|---|
| 2,283,858 | 5/1942 | Kuerner .................. 432/11 |
| 2,351,870 | 6/1944 | Newhouse .................. 34/136 X |
| 2,754,105 | 7/1956 | Pistorius et al. .................. 432/110 |
| 3,765,102 | 10/1973 | Fischer .................. 34/136 |

*Primary Examiner*—John J. Camby
*Attorney, Agent, or Firm*—Robert L. Andersen

[57] ABSTRACT

A novel method and apparatus for drying cohesive particulate polyvinyl chloride resin is provided. Adherent solids are mixed with recycle solids until free flowing and are fed to a turbulent primary drying zone provided with lifting flights and then transferred to a flight-free quiescent diffusion drying zone of the dryer.

9 Claims, 4 Drawing Figures

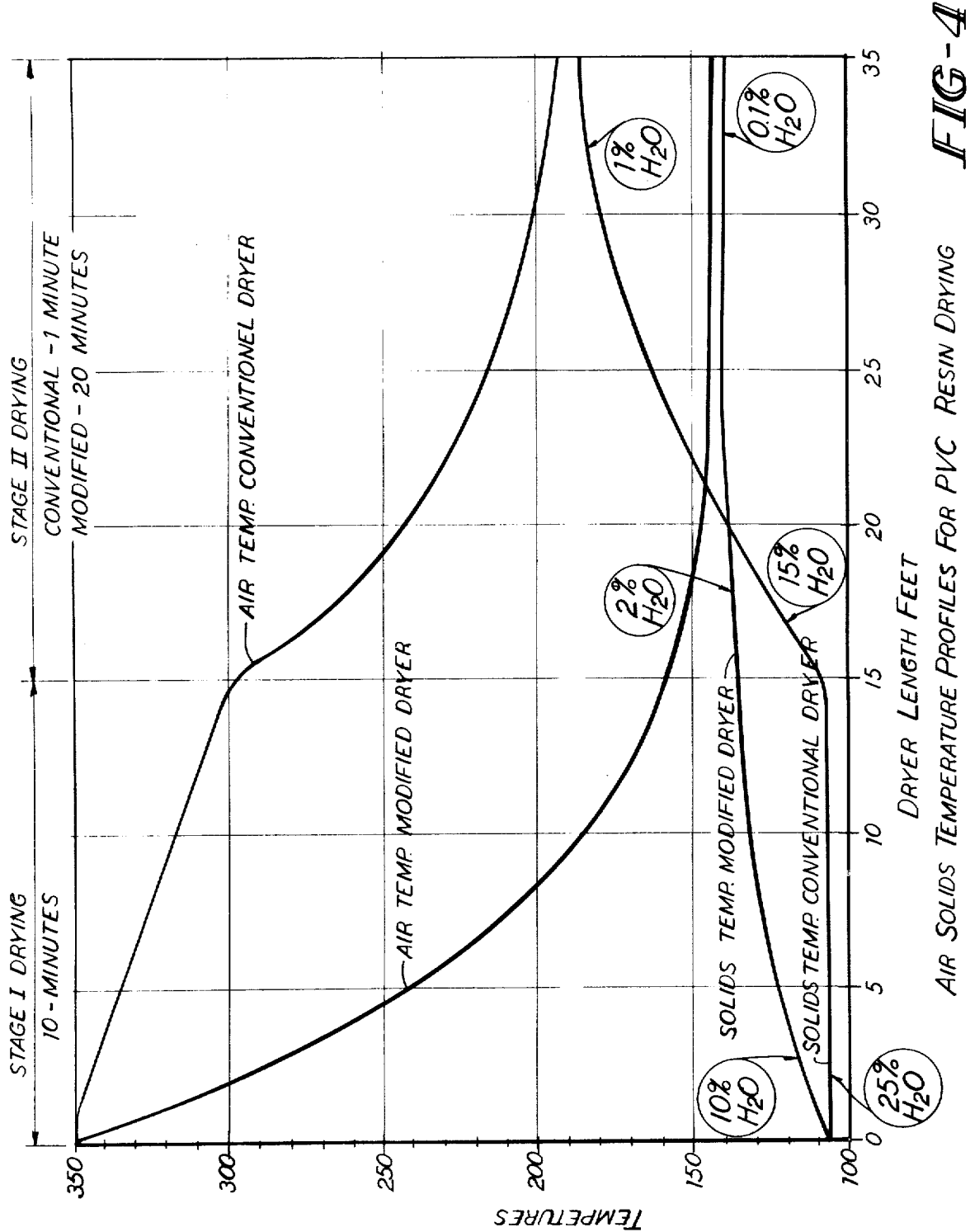

METHOD FOR DRYING ADHERENT PARTICULATE MATTER SUCH AS A POLYVINYL CHLORIDE RESIN

FIELD OF THE INVENTION

The present invention relates to a novel apparatus and method for drying moist, cohesive, particulate matter which tends to adhere in clumps to the wall of conventional rotary dryers when moist, and which becomes dusty when dry. More particularly, the invention relates to a method for drying polyvinyl chloride resins having an initial moisture content of 20-30 percent by weight to a moisture content of 0.5 percent or less in a rotary dryer whose structure is modified in accordance with the second aspect of the invention to dry cohesive particulate matter far more efficiently than conventional rotary dryers of comparable size.

DESCRIPTION OF THE PRIOR ART

Polyvinyl chloride monomer is polymerized in an aqueous medium to produce a suspension of fine grained solid particles in liquid. These are then separated by filtration or centrifugation and dried into a fine, dusty, free-flowing thermoplastic powder. The cake as recovered from the centrifuges contains about 25 percent residual moisture. The powder must be dried to less than 0.5 percent moisture to permit satisfactory use of the polyvinyl chloride (PVC) molding and extrusion machinery utilizing the thermoplastic plasticity of the PVC powder.

The wet PVC cake is customarily dried in rotary dryers with steam-heated air. The dryers are horizontally mounted, cylindrical steel drums fitting with steel tires to allow rotation about the horizontal axis. The rate of drum rotation is 2-6 rpm, air and solids pass co-currently through the dryer. The damp PVC cake from the centrifuge is sufficiently cohesive to adhere to the walls and other internal structures of the dryer. Heavy "knockers" are attached externally to the drum to dislodge to damp accumulations of cake of the internal structures. The internal perimeter of the rotating drum is fitted with a plurality of radial vanes (flights) parallel to the drum axis for elevating solids on the upward moving side of the drum and showering these solids through the internal air stream in the central region of the drum cross-section. The lifting vanes of flights in the feed end are relatively small and flat to avoid crevices and corners in which the damp PVC cake can pack stagnate. As the feed progresses toward the discharge end the moisture level in the bed of solids progressively declines and the caking tendency of the PVC diminishes. The flights are made larger and are fitted with angular lips to increase the load carrying capacity thereof. The heat transfer and drying rates are accelerated in the downstream portion of the dryer which has been fitted with larger flights and those having angular lips.

At moisture levels in the range of about 5-10 percent water the PVC resin becomes dusty and can remain suspended or entrained as dust in turbulent air which is passed co-currently through the drum. Because of the high heat transfer rate between dusty resin suspended in turbulent air, it has become customary to install several transverse baffles at intervals along the drum axis to promote turbulence and to enhance this mode of heat transfer drying through improved air flow. These transverse baffles extend across the entire cross-section of the drum and are provided with spaced openings to assure that air passage is uniform across the entire face of the baffle. The retention time of the resin held in turbulent suspension in the air stream is approximately that of the retention time of the air in the dryer so that the resin retention time is diminished as the rate of air flow is increased.

The typical rotary dryer used for PVC resin drying is 8-10 feet in diameter and 30-50 feet long. Maximum drying rates for an 8 × 30 foot drum are near 3,000 pounds per hour whereas the 10 × 50 foot drums can produce up to 6,000 pounds per hour. The internal volumes of these drums are respectively 1,500 and 4,000 cubic feet. Volumetric productivity is therefore about 1.5 to about 2.0 pounds PVC per hour per cubic foot of internal volume.

In drying PVC resin from a moisture content of 20-30 percent to less than 0.5 percent moisture, moisture removal about 25 to 2 percent proceeds as fast as heat can be supplied to the solids. In the range below 2 percent moisture, the rate of moisture volatization is limited by the rate of diffusion of moisture of the interior of the particles to the surface. At temperatures near 190°F. (the approximate limit of thermal stability of the PVC resin) the time required to dry from near 2 percent moisture to less than 0.25 percent moisture is on the order of two minutes. As the final drying temperatures are held lower, longer drying times must be allowed to reach the 0.25 percent limit. Alternatively, the resin can be dried to less than 0.25 percent moisture at lower temperatures and less exposure to possible thermal degradation as more drying time is made available in this portion of the drying range of the resin. With drying exposure times in the range of 10-20 minutes made available for the resin as in the present invention, maximum drying temperatures can be limited to levels below about 150°F., drying efficiency can be increased over conventional dryers utilizing temperatures of about 190°F. and stability problems are effectively avoided.

Heat transfer in PVC dryers of the conventional design is notoriously poor in the first half of the drum because (1) the damp cake is not free flowing, (2) the load capacity of the flights is low because of the small and flat flight configuration, and (3) the cake can stagnate on the walls of the flights out of intimate contact with heated air because of the cohesive nature of the cake. Because of poor heat transfer, the air temperature remains high, shell heat losses are appreciable, and moisture in the wet cake declines slowly in the forward half of the drum from about 25 to about 15 percent during a retention time of about 10 minutes.

Heat transfer in the second half of the drum of conventional dryers increases rapidly as the resin becomes more free flowing and is cascaded from flights with larger load carrying capacities. Unfortunately, as the ability for increased heat transfer increases in the second half of the conventional dryer the resin rapidly becomes entrained as dust in the air and is thereupon transported out of the dryer. The bulk of the flight structure of the second half of the dryer, therefore, remains unused because of the deficiency of the bed of resin to load the flight. The short residence time of the resin in the second half of the dryer drum is insufficient to cover diffusion drying time from 2 to below 0.5 percent. Hence, the rotary dryer must be backed up with an additional drying stage to attain the 0.25 percent level of moisture in the time interval available in the third stage of the drying operation.

Third stage drying occurs by contact between resin held on the walls of the filter bags and the hot dryer exhaust air in the product collecting filters. Filter residence time is equal to the time interval set for the operation of solids disengaging mechanism in the product collector. This time interval is relatively short (1–4 minutes) hence, drying (exhaust) temperatures must be relatively high, i.e., on the order of 190°F.

A disadvantage of the high exhaust temperatures required to shorten the resin drying time is the reduced thermal efficiency of the drying system and the larger volume of air required to dry the resin. Air enters the dryer, for example, at about 350°F. If this air is exhausted at 190°F., only 50 percent of the usable heat is extracted. Because of the higher drum temperatures of conventional dryers, less than 50 percent of the heat is effectively used for volatilization of moisture from the product. Thus, about 20 pounds of air are required to dry 1 pound of PVC. In accordance with the present invention, resin can be dried at temperatures as low as 140°F. At this temperature, 75 percent of the usable heat in the dryer can be extracted and drying losses are lower because of lower drum temperatures and increased heat transfer efficiency. Air required to dry the PVC is thereby reduced to less than 10 pounds of air per pound of PVC. It is, therefore, evident that for a fixed volume of heated air the modified dryer has a higher productive capacity than dryers of the conventional design. The modified dryer can dry about 3 lbs. PVC/hr. cubic ft. of internal volume as compared to 2 lbs./hr. cubic feet for dryers of conventional design.

Attempts to increase the capacity of conventional dryers by increasing the air rate is self-defeating because the residence time in the dryer is thereby shortened, necessitating a further increase in dryer exit temperature to shorten diffusion drying time and this in turn lowers thermal efficiency. In any event, the exit temperature must be held below the thermal stability limit of the PVC resin and this, then, sets the limit of productivity of PVC dryers of conventional design.

In accordance with the present invention, it has been found that heat transfer can be substantially increased by providing a dryer having a modified flight structure in the first half, a flight-free diffusion drying zone in the second half and means for recycling at least partially dried particulate from the diffusion or secondary drying zone to the forward end of the dryer. Air volumes, and temperatures may be substantially reduced per unit of productivity. In the second aspect of the present invention, a method is provided for drying PVC resin in a manner which is far more efficient than methods presently utilized.

This and other objects of the invention will become more apparent from the following description of the invention.

SUMMARY OF THE INVENTION

In accordance with the present invention, there is provided an apparatus for drying moist coherent particulate materials as exemplified by PVC resin comprising:

a. an elongated drum rotatable about a substantially horizontal axis having a feed end and a discharge end and adapted for co-current feed of heated drying gases and particulate matter, b. a primary drying zone proximate the feed end of said drum, the primary drying zone being provided with a plurality of spaced flights positioned about the perimeter of said primary zone, c. a secondary drying zone adjacent to said primary drying zone, said secondary zone being flight-free, the distal end of said secondary zone being defined by a dam ring of sufficient height to establish in said dryer a flowing bed of particulate matter having a desired depth, d. means for recycling at least partially dried particulate from said secondary drying zone to the feed end of said drum, e. means for removing dried particulate matter through the discharge end of said drum.

In the preferred embodiment of the invention, an internal conduit is provided for recycling at least partially dried resins to the feed end of the dryer to mix with the wet feed material to provide a free flowing feed to the primary drying zone of the dryer.

In a second aspect of the invention there is provided a process for drying polyvinyl chloride resins in a dryer which is rotatable about a substantially horizontal axis and which is adapted for co-current movement of heated gases and substrate from a feed end to a discharge end. This aspect of the invention comprises the steps of:

a. mixing polyvinyl chloride having a moisture content of about 20–30 percent by weight with sufficient recycle solids from a secondary drying zone to form a bed of flowable particulate polyvinyl chloride having a moisture content of about 5–20 percent by weight in a primary drying zone, b. lifting a portion of said bed to an upper region of said primary drying zone and releasing said portion to fall into said bed through a stream of heated gases, thereby drying to a moisture content of below about 5 percent by weight, c. entraining a portion of said particulate in said stream of heated gases and thereby transferring the same to a flight-free secondary drying zone, d. depositing entrained particulate in a bed of polyvinyl chloride particles in said secondary drying zone and keeping in fluid motion to permit diffusion drying to occur in said bed, e. recycling a portion of said bed from said secondary drying zone to step (a) and f. removing from the discharge end of said dryer a polyvinyl chloride product having a moisture not greater than 0.5 percent.

DETAILED DESCRIPTION OF THE INVENTION

Referring now to the drawing:

FIG. 4 is an air-solids temperature profile comparing heat transfer efficiency of a conventional dryer with that of the invention.

Figure 1:
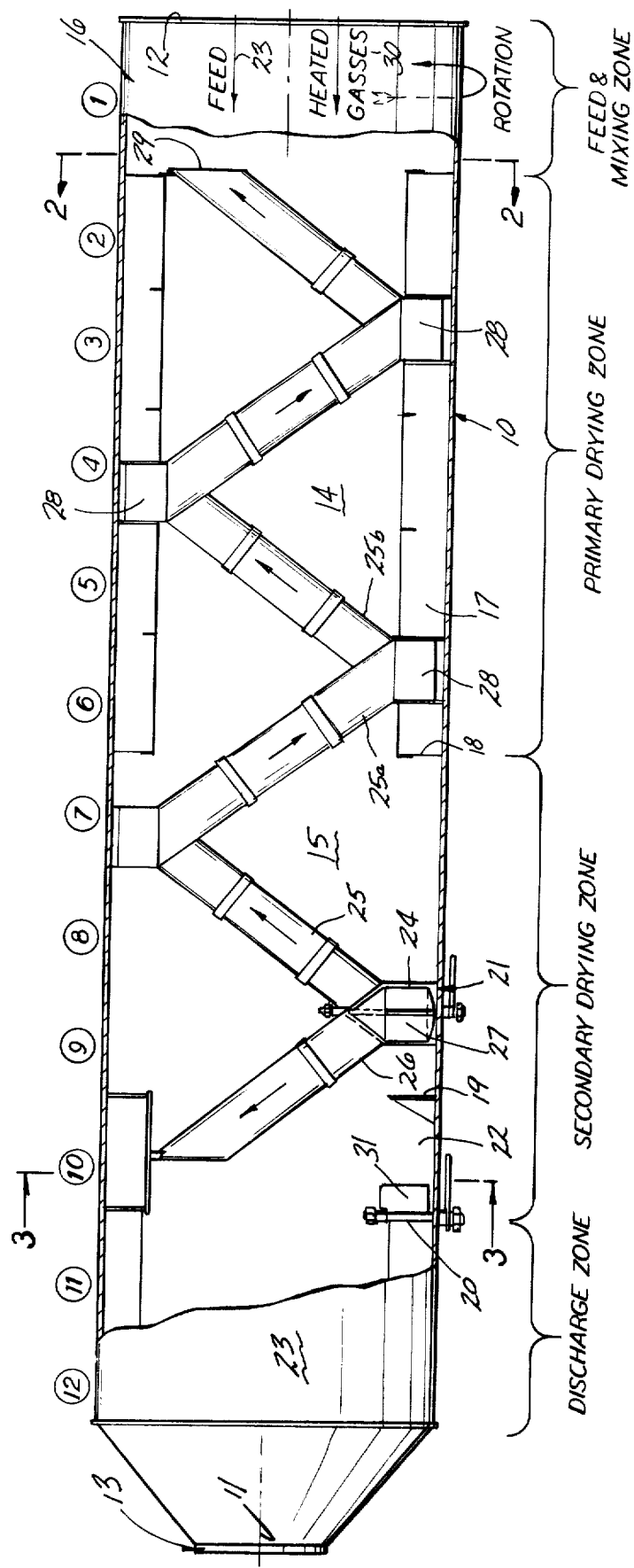
FIG. 1 is a side view of the apparatus of the present invention partially cut away at the center to show the structural detail of the primary and secondary drying zones.
Figure 2:
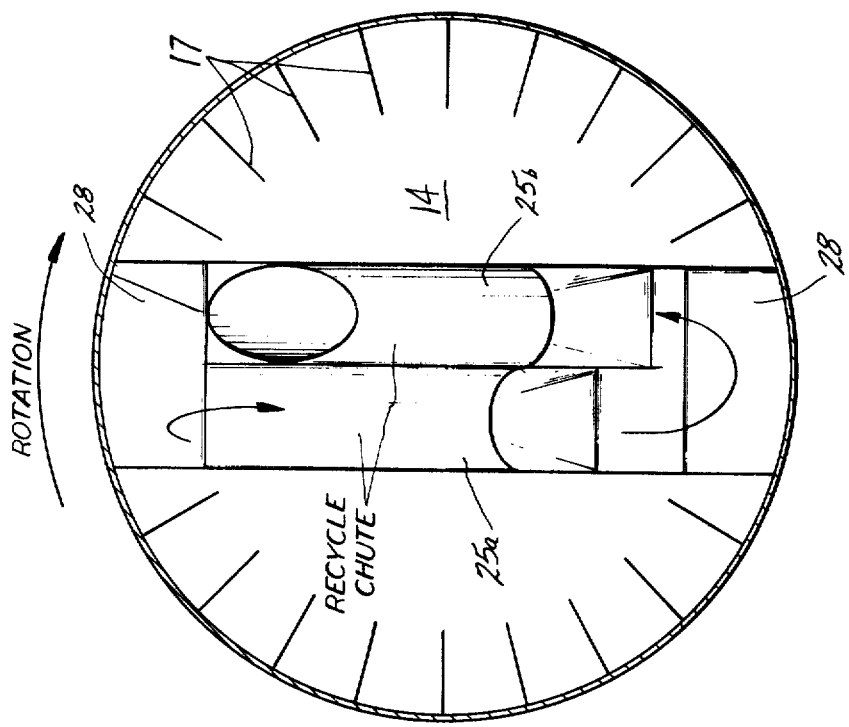
FIG. 2 is an end view of the primary drying zone taken at line 2—2 of FIG. 1 as viewed from the feed end of the structure.

As shown in FIG. 1, the apparatus of the present invention is generally an elongated drum 10 which is rotatable about a substantially horizontal axis 11. This drum is provided with feed end 12 and discharge end 13. Suitably the axis 11 may be either horizontal or slightly lower on the discharge end than on the feed end. The drum 10 is of generally cylindrical configuration but it may also be provided with a slightly greater circumference at the discharge end than at the feed end in order to assist in transfer of particulate matter therethrough.

The apparatus is provided with a primary drying zone 14 and a secondary drying zone 15. The primary drying zone is, as shown, situated proximate the feed end of the drum. Suitably, the primary drying zone may be preceeded by a feed and mixing zone 16 if desired and it is preferable that this zone be present in some form to assure adequate mixing of wet feed and recycle to provide a flowable, non-adherent feed to primary drying zone 14.

Primary drying zone 14 is provided with a plurality of circumferentially spaced flights 17 positioned about the perimeter of the primary drying zone. Preferably, the flights are attached to the wall of drum 10 and extend radially inward therefrom any desired distance. In a conventional 8-foot diameter dryer the flights in the feed end of the drum have a depth of about 4 to 6 inches in order that the wet particulate matter entering this end of the drum would not tend to stick to the flights. In the present dryer the flights are substantially larger, i.e., extend inwardly a greater distance from the wall of the drum 10 than in conventional dyers to maximize the transfer of particulate matter from the bed therein to the upper part of the primary drying zone where the particulate matter is showered through a bed of heated gases flowing co-currently to the axis of the drum. Suitably, the 8-foot dryer normally having flights of 4 to 6 inches may be provided with flights ranging from 8 to 16 inches depending on the depth of the bed which is to be utilized in the drying process. For example, if a bed depth of 12 inches is desired, the depth of the flights should also be about 12 inches in order to facilitate maximum transfer of solids to the upper portions of the drying zone. Larger diameter drums may accommodate even larger flights. The flights may comprise a single structure spanning the entire length of the primary drying zone or may be a multiplicity of shorter flights spanning this zone in either direct or staggered alignment as desired. The flights may be flat plates inclined in the direction of travel, plates which are curved, or flat or curved plates provided with a lip angled in the direction of travel, or any other desired configuration. This modified flight structure is made possible by providing a recycle from the secondary drying zone, which when mixed with the wet feed produces a flowable non-adherent bed of particulate which is lifted to the upper portion of the primary drying zone by the flights.

The far end or terminus of the primary drying zone may be defined by a dam ring 15 as shown in FIG. 1, but the presence of this ring is not critical to the invention. Dam ring 15 extends around the entire inner circumference of the drum 10 and is of a height sufficient to establish in the primary drying zone a bed of the desired depth. Thus if a bed depth of 12 inches in desired the height of the dam ring should also be 12 inches or slightly greater in order to assure that this bed height is maintained during operation of the dryer. If the volume of feed and recycle is such that the bed is too shallow to take full advantage of the flights the dam ring will restrain particles from entering the secondary drying zone until such time as the depth of the bed builds up to the desired level. A decreased air flow during this period of operation will assist in establishing the bed. In the event that the volume of feed and recycle is such as to build up a bed depth greater than that which is desired the dam ring will permit the excess to overflow into the secondary drying zone. Normally, however, the volume of feed and recycle will be controlled in any suitable manner to maintain the desired depth.

The primary source of material for the secondary drying zone is normally that which is entrained in the stream of drying gases which travel co-currently with the axis of the drum. As the particulate is showered or cascaded off of the flights onto the bed in primary drying zone the co-current force of the gases is sufficient to entrain the dryer particles and carry them into the secondary drying zone. The secondary drying zone is adjacent the primary drying zone on the downstream side of the drum.

In the conventional PVC dryer the section corresponding to the secondary drying zone would be provided with flights which were substantially larger than those found in the area of the primary drying zone. These flights would increase in size toward the end of the secondary drying zone, and would have successively larger lips and/or angles in order to handle larger amounts of particulate in the downstream portion of this zone. As indicated above, however, the presence of these larger flights in the second half of the dryer is of little avail since their capacity remains substantially unused due to the fact that the residence time in this portion of a conventional dryer is extremely limited due to the turbulence created by the flights. In accordance with the present invention, however, this difficulty has been overcome by providing a flight-free secondary drying zone where particulate coming from the primary drying zone is deposited in a fluid bed of moving particles which is kept in motion by the rotation of drum 10. Unlike the primary drying zone the secondary drying zone is an area of quiescent rolling motion wherein the bed is in contact with heated gases but is not entrained therein by virtue of the turbulence created by flights. Thus the secondary drying zone is an area designed for the specific purpose of enabling the particulate therein to remain in the zone for a residence time sufficient to complete diffusion drying of the particulate in the bed.

The distal end of the secondary drying zone is defined by one or more dam rings 19, 20, regulating the depth of the bed in the secondary drying zone. If a single dam ring 19 is utilized it is placed downstream from a collection zone 21 for recycle of at least partially dried particulate from the secondary drying zone to give that particulate which is not recycled to the feed end of the drum an opportunity to undergo final drying in the quiescent bed before being discharged from the drum.

Alternatively, two or more rings may be employed in the secondary drying zone to provide an additional area between dam rings for additional drying of particulate, none of which is to be recycled to the feed end of the drum.

It was noted above that the dam ring 18 at or about the terminus of primary drying zone may be utilized if desired. The use of dam ring 18 may be desired in order to separately control the depth of the bed in primary drying zone 14 and secondary drying zone 15 or to provide different bed depths in the two zones. Since this is generally not required the first dam ring in the secondary drying zone is adequate to control bed depth in both the primary and secondary zones.

As the bed depth builds up the secondary zone the dried particulate therein will overflow the dam ring 19 and either pass into the terminal drying area in this zone, as shown at 22, or it will pass to a discharge zone 23 provided with turbulance generating means which promote entrainment of particulate into the airstream and discharge from the dryer.

In addition to modifying the flight design in the primary drying zone and eliminating the flights from the secondary drying zone it will be noted that the turbulence producing transverse baffles which are positioned throughout a conventional dryer have been completely eliminated. It has been found that these transverse baffles are not necessary in a drum of the present design. These transverse baffles were positioned in the conventional dryer along the axis of the conventional dryer under the apparently erroneous belief that their presence increased the ability of the heating gases to penetrate the curtain of falling particulate in the flighted sections of the dryer. The theory was that if these baffles were not included the heated gases would pass through the void opposite the free-falling particles and would not efficiently dry the particles. It has been found, however, that as the heated gases traverse the baffled portion of the dryer the gases are drawn into the free-falling particulate and vice versa to set up what appears to be a spiral flow of the gases as they proceed through the drum. Thus this method of contacting the falling particulate has made possible the complete elimination of transverse baffles without a corresponding loss of heat transfer efficiency.

In order to assure maximum efficiency in the primary drying zone a means for recycling at least partially dried particulate from the secondary zone has been provided as shown in the drawings. While any external means for recycling the partially dried particulate from the secondary drying zone to the feed end of the dryer may be utilized, a novel internal means for gravitationally recycling the partially dried particulate to the feed end of the drum has been provided. In the preferred embodiment the recycled material is delivered to a mixing zone ahead of the primary drying zone on the feed end of the drum. The feed and mixing zone thus receives from the recycle conduit sufficient recycle solids to mix with the entering feed stream 23 which, in the case of polyvinyl chloride, contains a moisture content of 20–30 percent preferably about 25 percent to provide a bed of flowable particulate having a moisture content which is reduced to a point at which the resulting mass is free-flowing and will not adhere to the wall or flights of the primary drying zone. In the case of polyvinyl chloride a moisture content of 5– 20 percent, preferably 10–15 percent by weight is required to satisfactorily attain this condition.

As shown in FIG. 1 the recycle means is provided with a collection receptacle 24 which is positioned in the secondary drying zone. Collection receptacle 24 may be any suitable structure. As shown in the drawing it is a box open on the leading edge in the direction of rotation of the drum. Suitably the box is affixed to the wall of drum 10. The collection box 19 is provided with at least one outlet communicating with the recycle chute or conduit 25. It may also be provided with a second outlet communicating with a forward chute 26 in order to facilitate removal of particulate from the secondary drying zone when the bed of particulate is depleted as in closing down the operation of the drum. The flow of materials into the recycle chute 25 or forward chute 26 is controlled by a valve 27 which is preferably operable from the outside of the drum. As drum 10 rotates in the direction shown in FIG. 1 the open side of the collection box permits a portion of the fluid bed in the secondary drying zone to flow into a first section of the collection box. If it is desired to transfer material to the discharge zone of the drum the valve 22 is placed in closed position as shown in FIG. 1. As the drum continues its rotation the particulate which has entered the box is gravitationally fed through forward chute 26 into the discharge zone 23. The discharge zone is provided with turbulent producing flights which promote the entrainment of the particles therein into the heated gases passing therethrough, thus entraining the particulate in the gases and removing dried particulate from the dryer.

Figure 3:
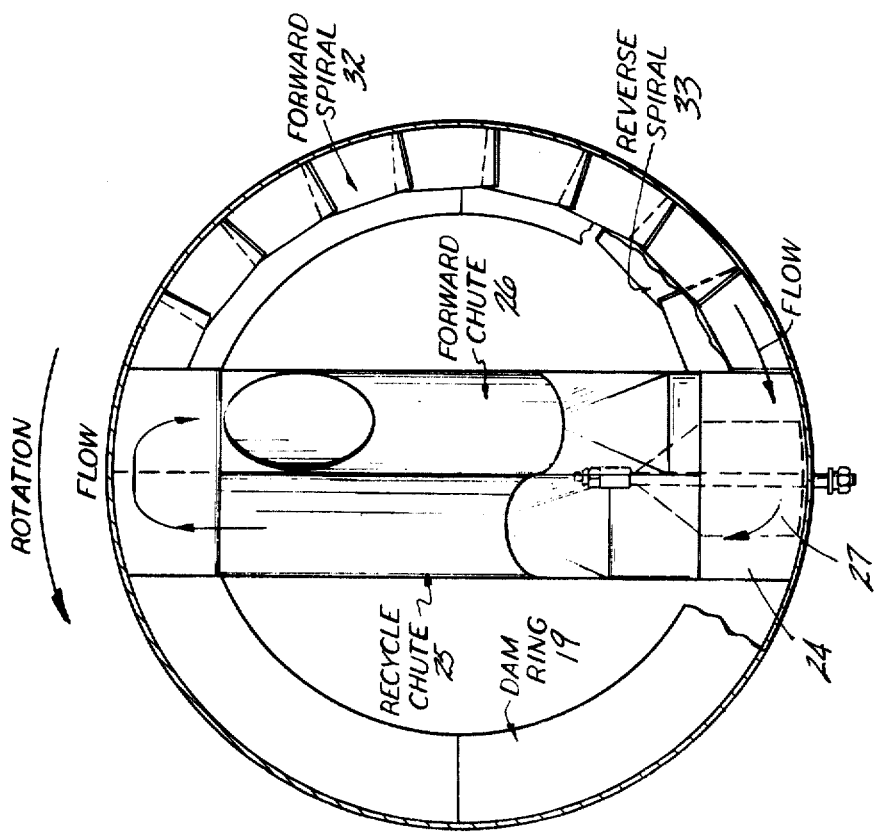
FIG. 3 is an end view of the secondary drying zone taken at line 3—3 of FIG. 1 as viewed from the discharge end showing the recycle control gate is fully opened (recycle) position.

If the valve 22 is in the open position as shown in FIG. 3, the particulate entering the collection box passes to the back side of the box as the drum rotates. The back side of the box communicates with recycle chute 25 and the particulate is fed gravitationally into the recycle chute during rotation of the drum.

While it is generally desirable to use either the fully opened or the fully closed position the valve 22 may also be partially opened or closed to regulate the flow of particulate to the forward chute or to the recycle chute. The secondary drying zone may also be provided with forward and/or reverse spirals 32 and 33 respectively, (FIG. 3) to regulate the flow of particulate into the collection receptacle as is well known to those skilled in this art. Furthermore, such spirals may be used to regulate the area within the secondary drying zone from which the particulate is to be fed to the recycle system in order to withdraw from the secondary drying zone material having a higher moisture content and to leave dryer materials in the zone to pass eventually to the discharge end of the drum. This additional feature, while not critical, is particularly advantageous where a single dam ring (19, FIG. 3) is employed in the secondary drying zone. The same effect, however, may be achieved either using a plurality of dam rings as described above or by obvious adjustments in the positioning and/or capacity of the collection receptacle and dam ring. By virtue of such variations the recycle system is readily adapted to the recycle of partially dried particulate or more completely dried particulate.

In addition to the collection vessel 24 the recycle system is a modified spiral conduit adapated to feed dried or partially dried particulate back through the primary and secondary drying zones and to deliver the same to the feed end of the drum, preferably to a mixing zone 16 ahead the primary drying zone. The recycle conduit comprises a plurality of transfer boxes 28 positioned in staggered or longitudinally offset positions or relationship on opposing walls of the drum, each of these boxes connected by sections of conduit 25. Each of the transfer boxes communicates with an incoming conduit 25a and an outgoing conduit 25b. The incoming conduit communicates with the leading side or end of the box as the drum rotates about its axis. As the transfer box rotates from a top position to a bottom position the recycle is fed through lines 25a into the transfer box. As the box rotates from a bottom position to a top position the recycle is fed to the following end of the box and ultimately into the exit conduit, and so on until the recycle reaches the ultimate outlet 29 at the feed end of the drum.

To assit in a better understanding the invention will now be described with particular reference to the drying of polyvinyl chloride (PVC) resin.

Partially dried PVC resin containing about 20–30 percent by weight moisture preferably about 25 percent is fed to the feed and mixing zone 16 at the feed end of the rotary dryer shown in FIG. 1. Simultaneously recycle solids having a moisture content between 1.0 and 5 percent by weight and are recycled to the feed end of the drum through outlet 29 or any other suitable recycle outlet. Preferably the recycle is provided in amounts sufficient to render the incoming wet PVC cake non-adherent, or substantially so and relatively free flowing. Desirably the feed and recycle streams are mixed in feed and mixing zone 16 prior to entry into primary drying zone 14 so that the particulate entering zone 15 has a moisture content below about 20 percent, suitably 5–20 percent, preferably 10–15 percent by weight water.

Heated drying gases, preferably air are fed via line 30 cocurrently with a direction of travel of the PVC through the drum at a temperature of 250°–400°F., preferably 300°–375°F.

As the recycle/feed mixture enters the primary zone 14 it is deposited in a bed of partially dried material. At the entrance end of the primary drying zone the average moisture content of the bed is below about 20 percent, usually in the range of 10–15 percent. The incoming particulate is deposited in and becomes an integral part of this bed. Due to the preliminary drying which was effected by mixing of recycle with feed, neither the bed nor the incoming particulate is adherent. Both are non-adherent and free flowing.

Also the drum 10 rotates about its axis at a rate, for example, from about 2 to 10 rpm as desired, flights 17 positioned in the primary drying zone lift portions of the bed of particulate PVC to an upper portion of the zone and release the particulate to free-fall through the stream of heated gases into the bed. The force of the heated gases advances the particulate during free-fall. This sequence is repeated several times before the entering of PVC is cycled through the primary drying zone to the secondary drying zone. Depending on the temperature of the heated gases, the velocity thereof and the length of the zone and residence time may suitably be from about 5 to about 15 minutes.

As the particulate in the primary drying zone nears the end thereof, it becomes successively drier and is entrained in and transferred to the secondary drying zone by the stream of heated gases. The moisture content at this point is below about 5 percent, suitably 1.5–5 percent.

In the secondary drying zone, the PVC particles become part of a fluid bed kept in motion by the rotation of the dryer. This section is free of turbulence causing flights so that particles which are exposed to the stream of heated gases are not entrained thereby or otherwise prematurely removed from this zone. Diffusion drying is allowed to occur in the bed during a residence time of several minutes, for example, 5 to 30 minutes, preferably 10 to 25 minutes, following which the particulate enters the discharge zone which may entrain the particulate in any suitable manner. Air exhaust temperature is suitably 130°–180°F., preferably 140°–170°F.

The recycle system operates as described above.

In order to provide the ability to clear the drum when closing down, dam ring gate 31 is provided in the one or more dam rings. This works in cooperation with forward chute 26 to clear the drum.

The process may be better understood with respect to the operation of the above-described dryer for polyvinyl chloride by reference to the following examples.

EXAMPLE I

A conventional PVC dryer having a diameter of 8 feet, a length of 35 feet, an axial slope of zero and a dryer rotation of 3.5 rpm. The drum was equipped with transverse baffle disks 78.5 inches in diameter with 1.5 inch holes staggered on 2-inch centers. This baffle was positioned perpendicular to the axis of the drum at distances of about 12, 17 and 21 feet from the free end of the drum. The flight configuration of the drum was as follows:

Flight Description

Type A: Radial vanes 34 inches long and 8 inches high

Type B: Radial vanes 34 inches long and 6 inches high with 3-inch lip extension at a 135° included angle Type C: Radial vanes 34 inches long and 8 inches high with 4-inch lip extension at a 90° included angle Type D: Spiral, forward feed vanes covering an axial zone length of 48 inches Flight and Baffle configuration (Zones numbered from feed end — see drawing FIG. 1, encircled numbers indicate zones).

Length of zone 1—48 inches
Length of zones 2 through 12—34 inches
Flights in zone 1—Type D
Flights in zones 2 and 3—18 Type A equally spaced
Flights in zones 4 and 5—9 Type A and 9 Type B uniformly spaced
Flights in zones 6 and 7—18 Type B uniformly spaced
Flights in zones 8 and 9—9 Type B and 9 Type C uniformly spaced
Flights in zones 10, 11, and 12—18 Type C uniformly spaced
Transverse baffles at end of zone 4; midway in zone 7 and midway in zone 9

Air flow through the dryer was 12,000 standard CFM. Inlet temperature was 350°F. outlet temperature was 200°F. A PVC cake having a moisture content of 25 percent was fed to the drum at maximum capacity, 3,000 lbs./hr. The drying rate per cubic foot of internal volume was 2 lbs./hr. Dried particulate leaving the discharge end of the drum has a moisture content of about 2 percent. The remaining moisture was removed in an external third stage dryer during transmission of the product to a bagging station to produce a final moisture content of 0.25 percent. The heat required per pound of PVC was 1400 btu's per pound of PVC. Knocker rings were needed on the dryer shell to dislogdge moist cake PVC on the interior surface. It was found that the replacement period for product recovery bags in the exhaust air filter was about 90 days. Accelerated deterioration of the collector bags occurred due to the high exhaust temperature of the air.

EXAMPLE II

A PVC dryer having a diameter of 8 feet, a length of 35 feet, an axial slope of 0 and a drum rotation of 3.5 rpm was utilized in this example. The transverse baffles described in the preceeding example were eliminated entirely. The flight description and flight and conveyor configuration in the dryer is as follows:

Flight Description

Type AA: Radial vanes 34 inches long and 12 inches high
Type CC: Radial vanes 34 inches long and 8 inches high with a 4-inch lip extension at a 90° included angle
Type DD: Spiral forward feed vanes covering an axial zone length of 48 inches.

Flight and Conveyor Configuration in dryer drum (Zones numbered from feed end) (as shown in encircled numerals of FIG. 1)
Length of zone 1—48 inches
Length of each zones 2 through 12—34 inches
Flights in zone 1—Type DD
Flights in zones 2, 3, 4, 5, and 6—Type AA
Flights in zones 7, 8, 9, and 10—None
Flights in zones 11 and 12—Type CC
Dam ring 12 inches high at end of zone 9
Dam ring 12 inches high at end of zone 10
Internal recycle conveyor chute originating in zones 7, 8, 9, and terminated in zone 1
Internal forward conveyor chute originating in zones 7, 8, 9, and terminated in zone 10.

Air flow was provided to the feed end of the dryer at 8,400 standard CFM. Inlet temperature was 350°F., outlet temperature was 150°F. It was found that the maximum PVC drying capacity was 4200 lbs./hr. as opposed to 3000 lbs./hour for the conventional dryer. The dryer rate per cubic foot of internal volume was 2.8 lbs./hr. Moisture in the feed material was 25 percent. Moisture in the product removed from the discharge end of the dryer was below 0.25 percent. It was found that knocker rings were not needed on the shell to dislodge moist cake PVC from internal surfaces. It was also found that the replacement period for product recovery bags in the exhaust air filter was improved over from Example I from about 90 days to 180–270 days utilizing identical bags. This improvement is attributed to the operation of the product collection bags at lower temperatures. The heat required was 700 btu/lb. of PVC, approximately half that required in Example I.

EXAMPLE III

From the data collected by operating the conventional dryer and the dryer modified in accordance with the present invention one is able to establish air/solids temperature profiles for PVC resin drying. The comparative profile appears in FIG. 4. It is apparent from this profile that overall heat transfer is substantially increased by the present design. In the conventional design the moisture content in the first half of the dryer was reduced from 25 to only 15 percent while air temperature was reduced from about 350° to about 300°F. By contrast, in the modified design of the present invention the water content of the solids was almost immediately reduced to 10 percent and by the time the solids reached the half-way mark, the water content had been reduced to about 2 percent. At the same time the air temperature of the modified design had been reduced from 350° to about 160° indicating that heat transfer had been far more efficient.

By the time the solids in the dryer of conventional design had reached the discharge point, the moisture content was about 1 percent. Correspondingly, the air temperature at the discharge end of the dryer was about 200°F., a total drop of only 150°F. By contrast, the moisture content of the solids leaving the discharge end of the modified design was about 0.1 percent and the air temperature at the discharge end was approximately 140°F., a drop of 200°F.

I claim:

1. A method for drying cohesive particulate materials in an elongated substantially cylindrical drum which is rotatable about a substantially horizontal axis, which has a feed end and a discharge end through which heated drying gases are fed cocurrently with said particulate from said feed end to said discharge end, wherein the method comprises:
   a. feeding wet cohesive particulate and sufficient at least partially dried recycle particulate to a feed and mixing zone at the feed end of said drum and mixing to provide a substantially non-adherent and relatively free-flowing feed,
   b. advancing said feed to the bed of a primary drying zone provided with a plurality of circumferentially spaced flights,
   c. lifting a portion of said bed on said flights to an upper portion of said primary drying zone and releasing said portion to freefall into said bed through a stream of heated gases,
   d. entraining a portion of said particulate in said stream of heated gases and depositing entrained particulate in the bed of a flight-free secondary drying zone adjacent said primary drying zone,
   e. maintaining the bed of said secondary drying zone in rolling motion and keeping the surface of said bed in contact with said stream of drying gases to permit diffusion drying to occur and provide at least partially dried particulate,
   f. recycling a portion of said at least partially dried particulate from the bed of said secondary drying zone to said feed and mixing zone,
   g. removing dried particulate through the discharge end of said dryer.

2. The method of claim 1 wherein said particulate is polyvinyl chloride resin.

3. The method of claim 2 wherein the wet feed to said primary drying zone has a moisture content in the range of 20–30 percent by weight.

4. The method of claim 2 wherein said recycle particulate has a moisture content in the range of 1.0 to 5 percent by weight.

5. The process of claim 2 wherein the feed to said primary drying zone has a moisture content in the range of 5–20 percent.

6. The process of claim 2 wherein the bed of said secondary drying zone has a moisture content below about 5 percent by weight.

7. The process of claim 2 wherein said heated gases are fed at a temperature in the range of 250°–400°F and wherein said dried particulate has a moisture content of 0.5 percent by weight or less.

8. A method for drying polyvinyl chloride resin drum dryer rotatable about a substantially horizontal axis which has a feed end and a discharge end through which heated drying gases are fed cocurrently with said particulate from said feed end to said discharge end, comprising:
   a. feeding wet polyvinyl chloride resin having a moisture content in the range of 20–30 percent by weight and sufficient recycle polyvinyl chloride resin having a moisture content of 1.0 to 5 percent by weight of a feed and mixing zone at the feed end of said dryer and mixing to provide a non-adherent relatively free-flowing feed to a primary drying zone, said feed having a moisture content in the range of 5–20 percent by weight,
   b. advancing said feed to a primary drying zone provided with a plurality of circumferentially spaced flights and depositing the same in a bed of partially dried polyvinyl chloride resin,
   c. lifting a portion of said bed on said flights to an upper portion of said primary drying zone and releasing said portion to free-fall through a stream of heated gases fed at temperature in the range of 200° to 350°F,
   d. entraining a portion of said free-falling portion having a moisture content below about 5 percent by weight in said stream of heated gases and advancing the entrained portion of the bed of a flight-free secondary drying zone of said drum,
   e. maintaining the bed of said secondary drying zone in rolling motion in contact with said stream of heated gases permitting diffusion drying to occur while said resin is retained in said secondary drying zone,
   f. recycling a portion of said resin from said secondary drying zone to step (a), and
   g. removing dried resin having a moisture content below about 0.5 percent by weight from the discharge end of said dryer.

9. The process of claim 8 wherein said heated gases are discharged from said dryer at a temperature in the range of 130°–180°F.

* * * * *